Figure 1:
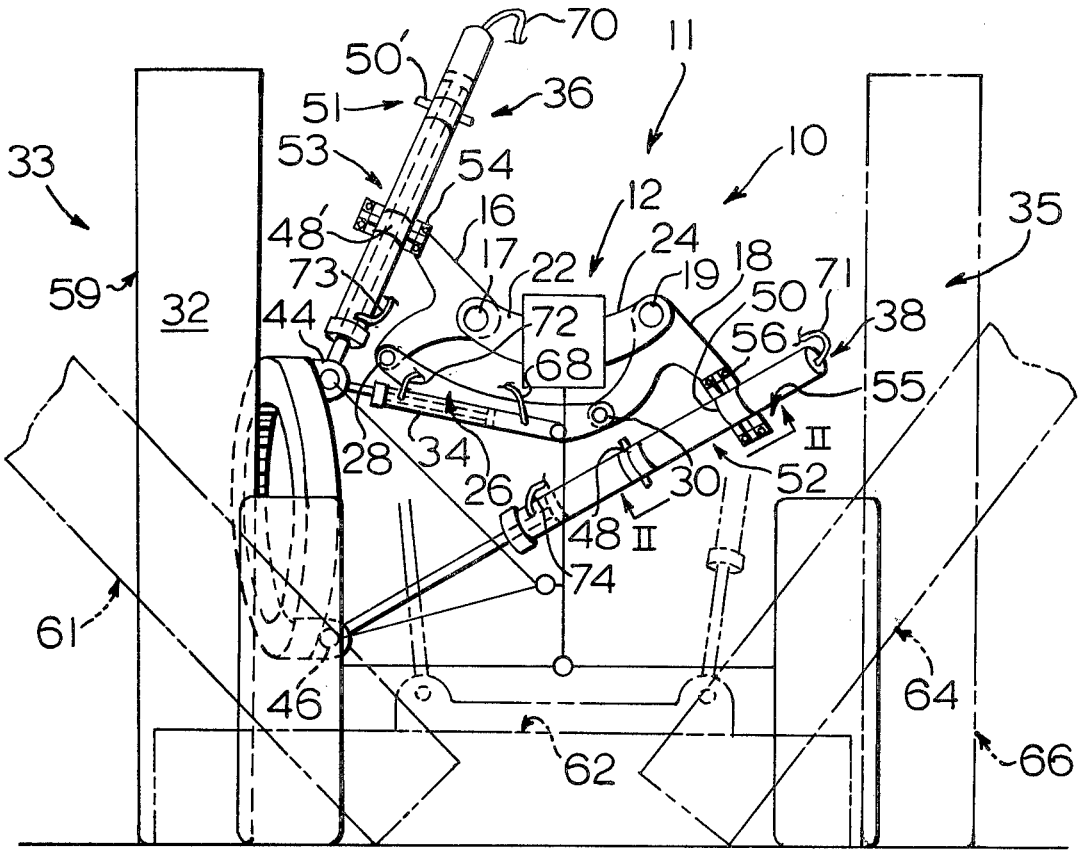
Figure 2:
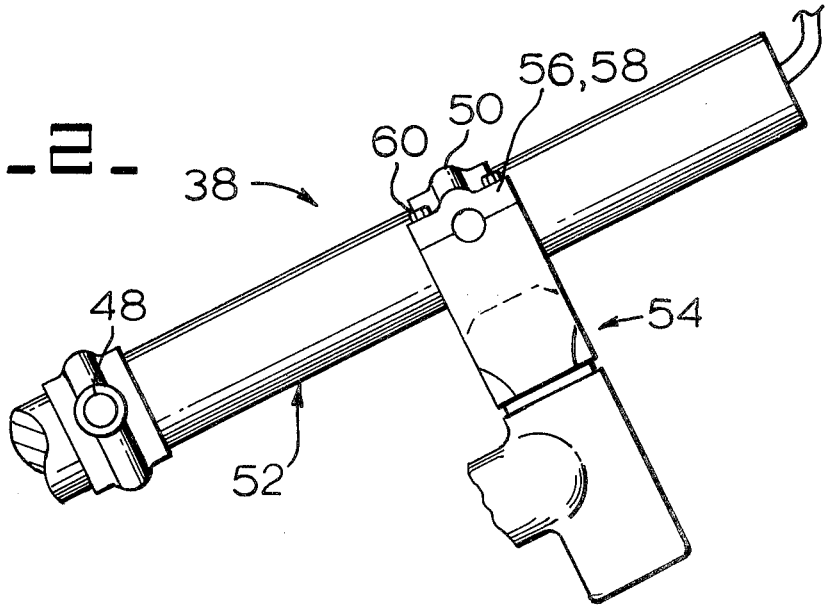

United States Defensive Publication [19] (H) [11] T984,004

Morris [43] Jul. 3, 1979

[54] GRADER BLADE ACTUATOR

[75] Inventor: Carlisle S. Morris, Decatur, Ill.

[73] Assignee: Caterpillar Tractor Co., Peoria, Ill.

[21] Appl. No.: 932,839

[22] Filed: Aug. 11, 1978

Related U.S. Application Data

[63] Continuation of Ser. No. 826,213, Aug. 19, 1977, abandoned.

[51] Int. Cl.[2] ..... E02F 3/76

[52] U.S. Cl. ..... 172/793; 172/797

[57] ABSTRACT

A grader blade actuator comprises a frame, a pair of pivot arms connected to said frame, a link member pivotally interconnecting the arms, a blade member, and a diagonal fluid cylinder connecting the link member to the blade member. The blade actuator further comprises a pair of fluid lift cylinders which are of a construction sufficient for connecting each pivot arm to a respective end portion of the blade member.

One or both of the lift cylinders has two or more spaced apart releasable connectors 48 and 50 or 48′ and 50′ which are selectively connectable to the respective pivot arm for providing vertical positioning of the blade member.

7 Claims, 1 Sheet Drawing,

8 Pages Specification

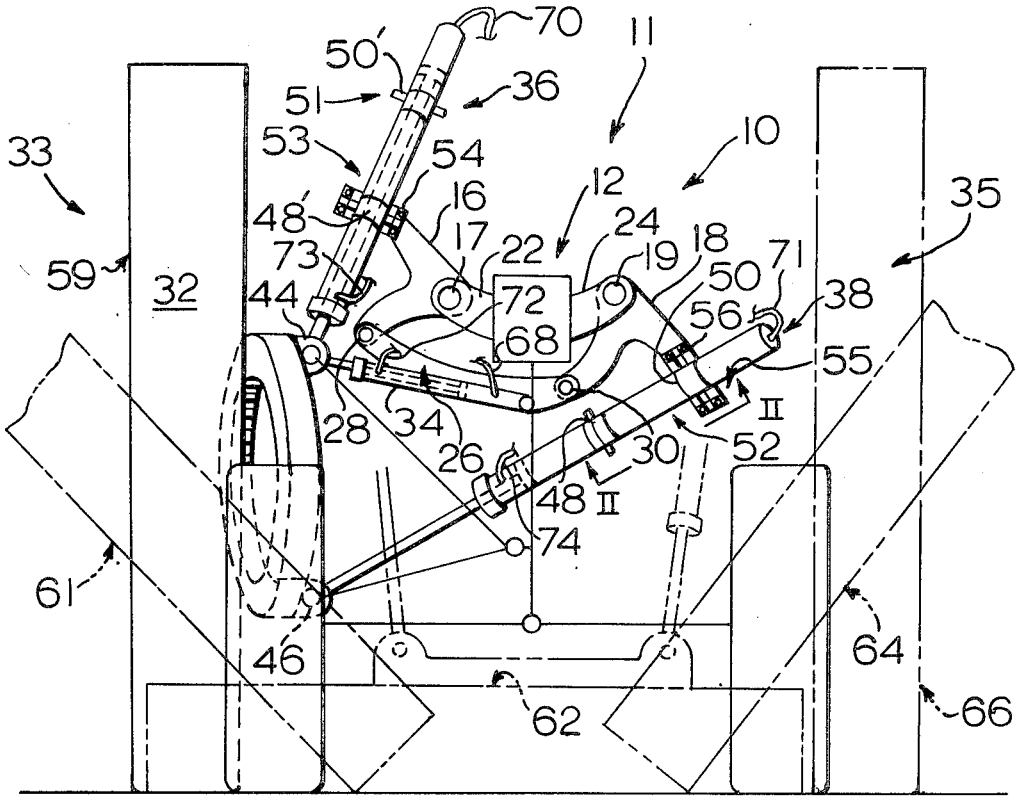

The file of this unexamined application may be inspected and copies thereof may be purchased (849 O.G. 1221, Apr. 9, 1968).